United States Patent
Miyagi

(10) Patent No.: US 10,859,171 B2
(45) Date of Patent: Dec. 8, 2020

(54) PRESSURE CONTROL DEVICE

(71) Applicant: NIDEC TOSOK CORPORATION, Kanagawa (JP)

(72) Inventor: Masaru Miyagi, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 0 days.

(21) Appl. No.: 16/789,398

(22) Filed: Feb. 12, 2020

(65) Prior Publication Data
US 2020/0278036 A1 Sep. 3, 2020

(30) Foreign Application Priority Data

Feb. 28, 2019 (JP) .................................. 2019-035168

(51) Int. Cl.
*F16K 11/07* (2006.01)
*B01D 29/05* (2006.01)
*F16D 48/02* (2006.01)

(52) U.S. Cl.
CPC .......... *F16K 11/0708* (2013.01); *B01D 29/05* (2013.01); *B01D 2201/30* (2013.01); *B01D 2201/34* (2013.01); *F16D 25/14* (2013.01); *F16D 48/02* (2013.01); *F16D 2048/0209* (2013.01)

(58) Field of Classification Search
CPC ....................... B01D 2201/30; B01D 2201/34; B01D 29/05; F16D 2048/0209; F16D 25/14; F16D 48/02; F16H 61/143; F16K 11/07; F16K 11/0708; F16K 27/041; F16K 37/0033; F16K 37/0041
See application file for complete search history.

(56) References Cited

U.S. PATENT DOCUMENTS 9,488,268 B2 * 11/2016 Yamada .............. F16H 61/0021

FOREIGN PATENT DOCUMENTS

JP 2014234829 12/2014

* cited by examiner

*Primary Examiner* — Terry K Cecil
(74) *Attorney, Agent, or Firm* — JCIPRNET

(57) ABSTRACT

A pressure control device includes a body having a groove-shaped flow path including a groove part and a widened part; a filter unit having a frame body including a through hole part that penetrates in a direction orthogonal to a central axis, a filter member in a planar plate shape disposed on one end side in a direction of an axis of the groove-shaped flow path with respect to the through hole part, and a seal member in a ring shape disposed along an outer-side circumferential edge part of the frame body when viewed from the through hole part; and a plate-shaped member being attached to the body to cover the groove-shaped flow path in a state where the filter unit is accommodated in the widened part. The frame body has a regulating part which regulates a disposition direction of the filter member with respect to the groove part.

13 Claims, 10 Drawing Sheets

PRESSURE CONTROL DEVICE

CROSS REFERENCE TO RELATED APPLICATIONS

This application claims the priority benefit of Japanese Patent Application No. 2019-035168, filed on Feb. 28, 2019. The entirety of the above-mentioned patent application is hereby incorporated by reference herein and made a part of this specification.

FIELD OF THE INVENTION

The disclosure relates to a pressure control device.

BACKGROUND

Regarding an oil pressure control device for controlling an oil pressure, for example, an oil pressure control device mounted on an automobile for the clutch is known. The oil pressure control device includes a body having a flow path through which hydraulic oil passes, and a filter in a circular cylindrical shape that is provided in the middle of the flow path and captures foreign matters such as powder mixed in the hydraulic oil.

Further, in general, in an oil pressure control device, when a filter is inserted into a flow path of a body and these members are assembled together to manufacture the oil pressure control device, the assembly work is often performed manually, for example.

However, in the oil pressure control device described in Patent Document 1, the thinner the flow path is (that is, the smaller the width of the flow path is), the more difficult it is to perform the insertion work of the filter into the flow path. Therefore, there has been a problem that the efficiency of assembly work of the body and the filter is low.

SUMMARY

An aspect of a pressure control device of the disclosure includes: a body which has a groove-shaped flow path including a groove part and a widened part connected to the groove part and having a width larger than a width of the groove part; a filter unit which captures foreign matters mixed in a fluid which passes through the groove-shaped flow path, wherein the filter unit has a frame body including a through hole part which penetrates in a direction orthogonal to a central axis of the frame body, a filter member being in a planar plate shape disposed on one end side in a direction of an axis of the groove-shaped flow path with respect to the through hole part, and a seal member in a ring shape disposed along an outer-side circumferential edge part of the frame body when viewed from the through hole part, wherein the filter unit is accommodated in the widened part so that a direction of the central axis of the frame body is along a depth direction of the widened part; and a plate-shaped member which is attached to the body to cover the groove-shaped flow path in a state where the filter unit is accommodated in the widened part, wherein the frame body has a regulating part which regulates a disposition direction of the filter member with respect to the groove part.

The above and other elements, features, steps, characteristics and advantages of the present disclosure will become more apparent from the following detailed description of the preferred embodiments with reference to the attached drawings.

DETAILED DESCRIPTION

Hereinafter, a pressure control device of the disclosure will be described in detail based on preferred embodiments shown in the accompanying drawings.

In each drawing, the Z-axis direction is the vertical direction Z. The X-axis direction is the left-right direction X in the horizontal direction orthogonal to the vertical direction Z. The Y-axis direction is the axial direction Y orthogonal to the left-right direction X in the horizontal direction orthogonal to the vertical direction Z. The positive side in the vertical direction Z is referred to as "the upper side," and the negative side is referred to as "the lower side." The positive side in the axial direction Y is referred to as "the front side," and the negative side is referred to as "the rear side." The front side corresponds to the one side in the axial direction, and the rear side corresponds to the other side in the axial direction. Further, the upper side, the lower side, the front side, the rear side, the vertical direction, and the left-right direction are simply names for describing the relative positional relationship of each part, and the actual dispositional relationship and the like may be a dispositional relationship and the like other than the dispositional relationship and the like indicated by these names. Further, a "plan view" refers to a state viewed from the upper side toward the lower side.

Hereinafter, a first embodiment of the pressure control device of the disclosure will be described with reference to FIG. 1 to FIG. 9.

Figure 1:
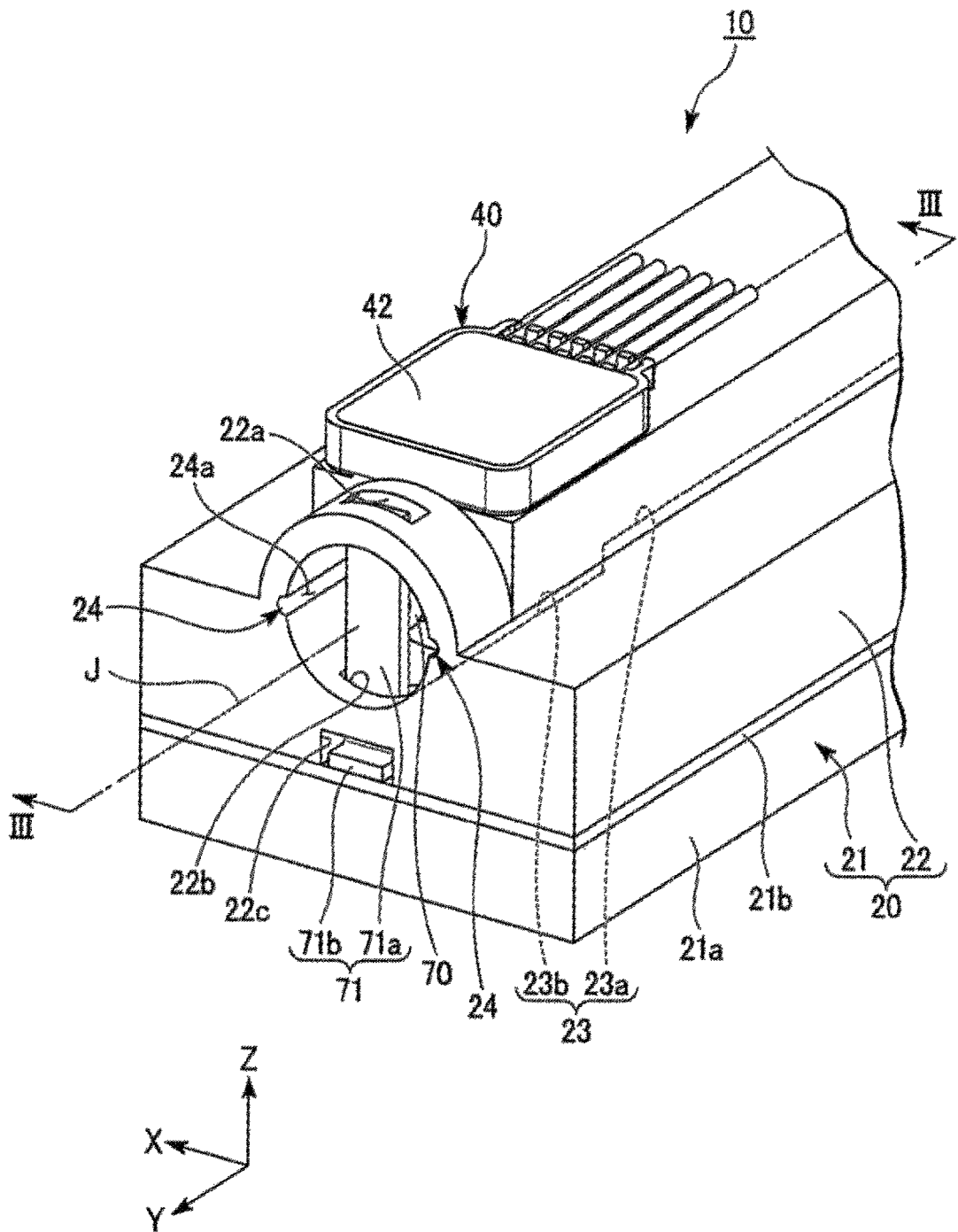
FIG. 1 is a perspective view showing a first embodiment of a pressure control device of the disclosure.
Figure 2:
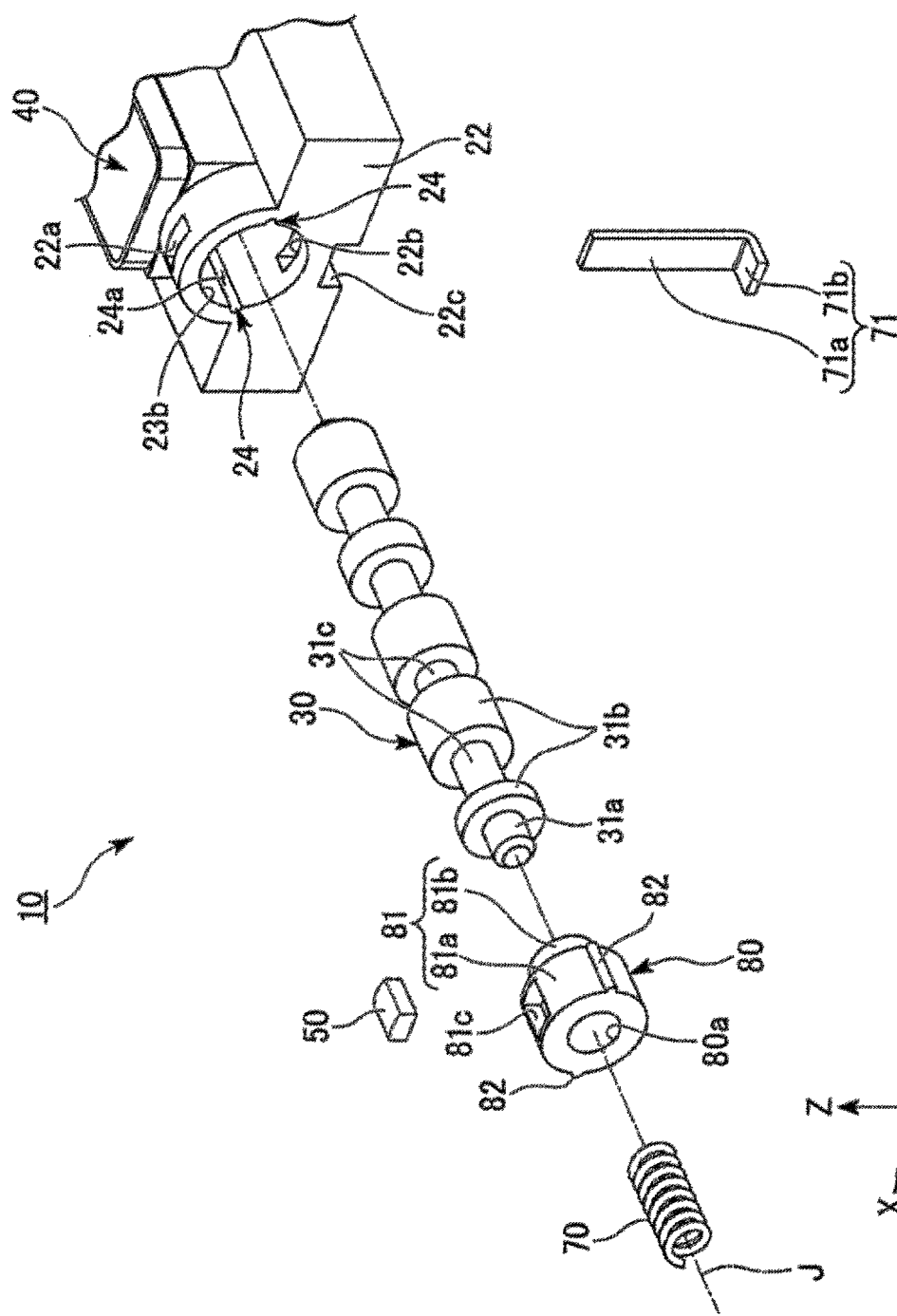
FIG. 2 is an exploded perspective view of the pressure control device shown in FIG. 1.

A pressure control device 10 of the embodiment shown in FIG. 1 and FIG. 2 is, for example, a control valve mounted on a vehicle. The pressure control device 10 includes an oil passage body 20, a spool valve 30, a magnet holder 80, a magnet 50, an elastic member 70, a fixing member 71, and a sensor module 40.

Figure 3:
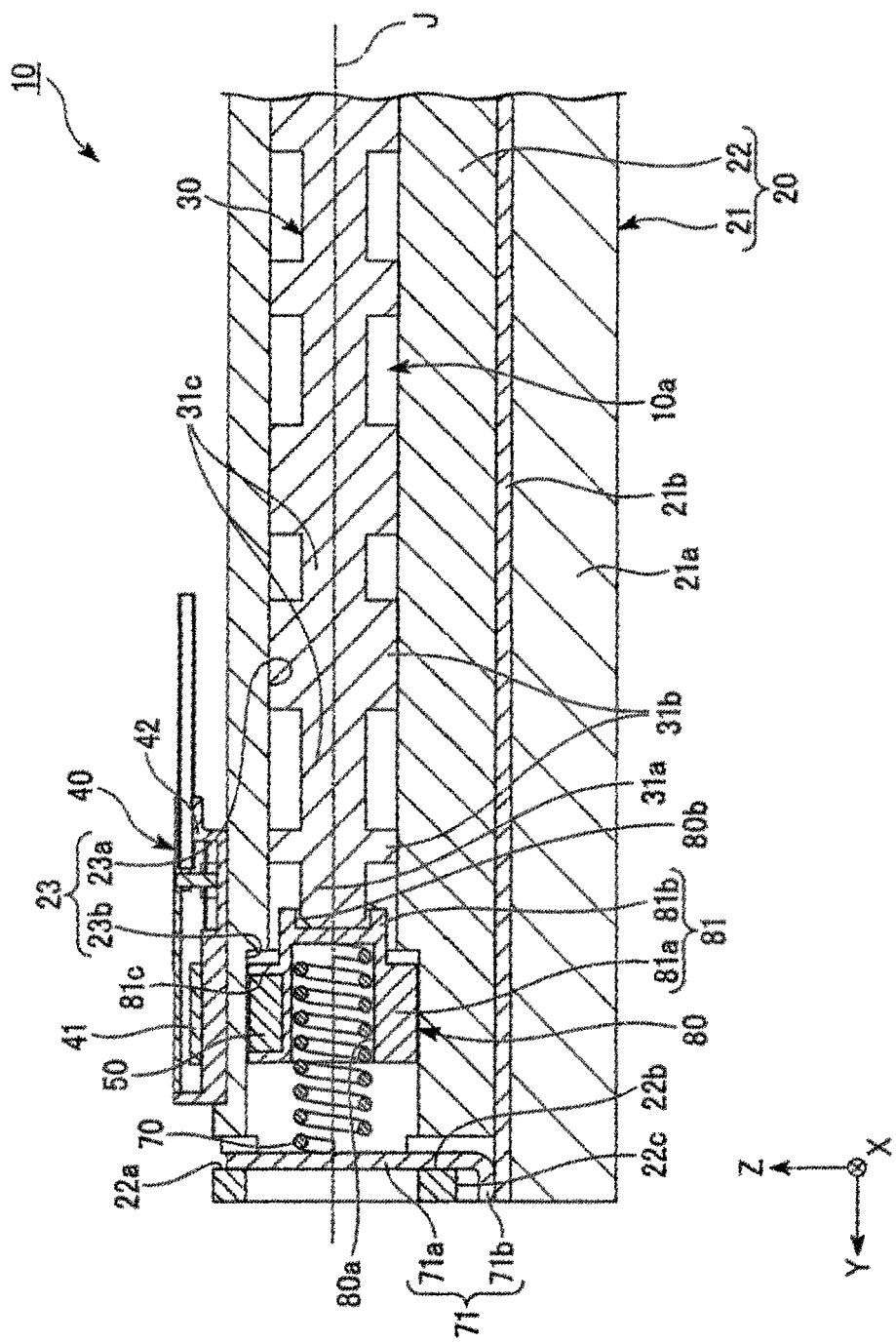
FIG. 3 is a cross-sectional view taken along the line III-III in FIG. 1.

As shown in FIG. 3, the oil passage body 20 includes therein an oil passage 10a through which oil flows. The part of the oil passage 10a indicated in FIG. 3 is a part of a spool hole 23 (to be described later). Each drawing shows a state in which a part of the oil passage body 20 is cut out, for example. As shown in FIG. 1, the oil passage body 20 includes a lower body 21 and an upper body 22. Though omitted in the drawings, for example, the oil passage 10a is provided in both the lower body 21 and the upper body 22.

The lower body 21 includes a lower body main body 21a and a separate plate 21b disposed to overlap the upper side of the lower body main body 21a. In the embodiment, the upper surface of the lower body 21 corresponds to the upper surface of the separate plate 21b and is orthogonal to the vertical direction Z. The upper body 22 is disposed to overlap the upper side of the lower body 21. The lower surface of the upper body 22 is orthogonal to the vertical direction Z. The lower surface of the upper body 22 contacts the upper surface of the lower body 21, that is, the upper surface of the separate plate 21b.

As shown in FIG. 3, the upper body 22 includes the spool hole 23 extending in the axial direction Y. In the embodiment, the cross-sectional shape of the spool hole 23 orthogonal to the axial direction Y is a circular shape with a central axis J as the center. The central axis J extends in the axial direction Y. Further, a radial direction with the central axis J as the center is simply referred to as "the radial direction," and a circumferential direction with the central axis J as the center is simply referred to as "the circumferential direction."

The spool hole 23 opens at least on the front side. In the embodiment, the rear end of the spool hole 23 is closed. That is, the spool hole 23 is a hole that opens on the front side and has a bottom part. Further, the spool hole 23 may open on both sides in the axial direction Y, for example. At least a part of the spool hole 23 constructs a part of the oil passage 10a in the oil passage body 20.

The spool hole 23 includes a spool hole main body 23a and a guiding hole part 23b. Though omitted in the drawings, the oil passage 10a provided in a part other than the spool hole 23 in the oil passage body 20 opens on the inner circumferential surface of the spool hole main body 23a. The inner diameter of the guiding hole part 23b is larger than the inner diameter of the spool hole main body 23a. The guiding hole part 23b is connected to the front-side end part of the spool hole main body 23a. The guiding hole part 23b is the front-side end part of the spool hole 23 and opens on the front side.

Figure 4:
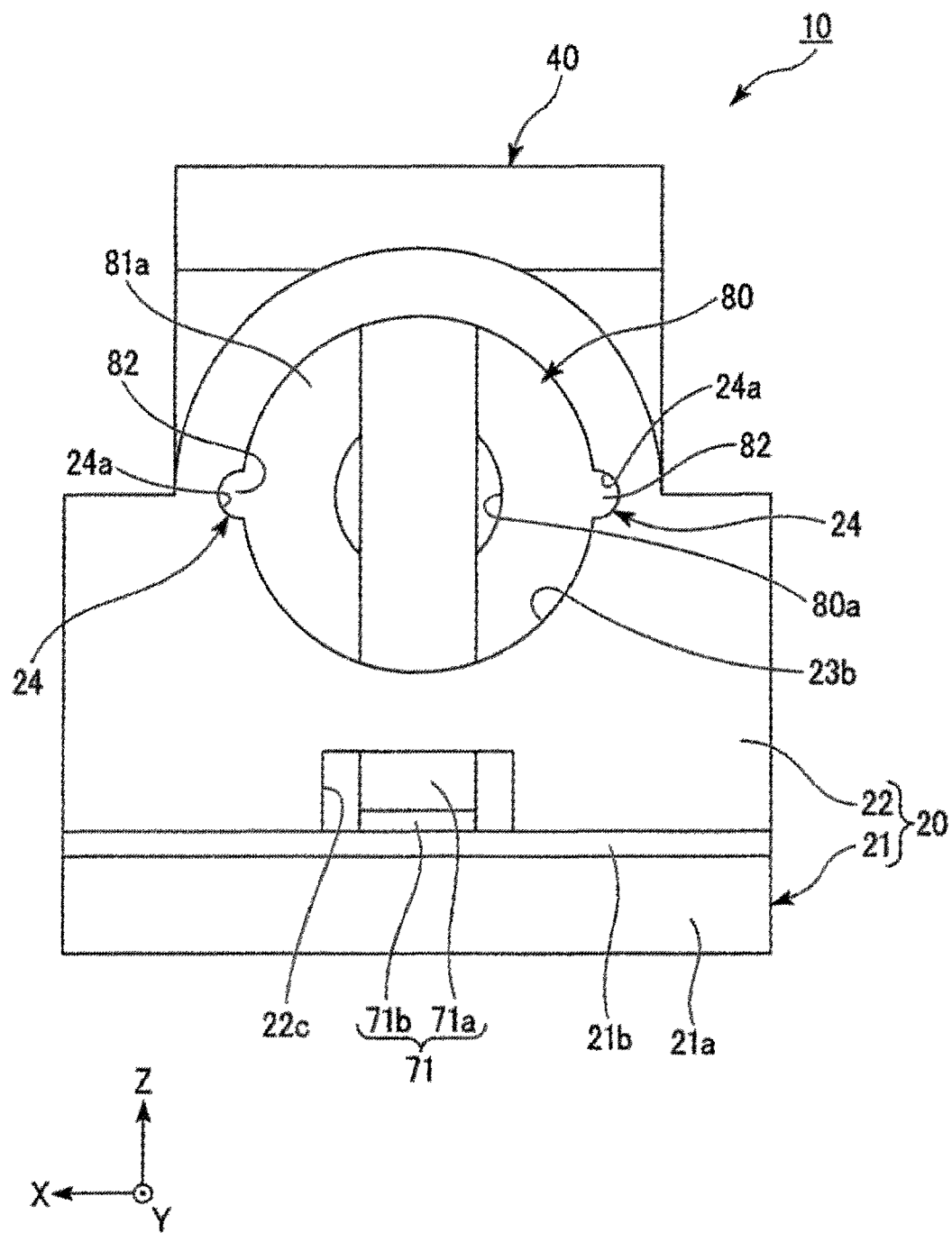
FIG. 4 is a view of the pressure control device shown in FIG. 1 as viewed from the front side.

As shown in FIG. 1, the spool hole 23 includes a groove part 24 that is recessed from the inner circumferential surface of the spool hole 23 toward the radial-direction outer side and extends in the axial direction Y. In the embodiment, a pair of groove parts 24 are provided across the central axis J. The pair of groove parts 24 are recessed from the inner circumferential surface of the guiding hole part 23b toward both sides in the left-right direction X. The groove part 24 is provided from the front-side end part on the inner circumferential surface of the guiding hole part 23b to the rear-side end part on the inner circumferential surface of the guiding hole part 23b. As shown in FIG. 4, an inner side surface 24a of the groove part 24 is in a semicircular arc shape that is concave from the inner circumferential surface of the guiding hole part 23b toward the radial-direction outer side when viewed from the front side.

As shown in FIG. 3, the upper body 22 includes through holes 22a, 22b, 22c at the front-side end part of the upper body 22. The through hole 22a penetrates a part in the upper body 22 from the upper surface of the upper body 22 to the inner circumferential surface of the guiding hole part 23b in the vertical direction Z. The through hole 22b penetrates a part in the upper body 22 from the lower surface of the upper body 22 to the inner circumferential surface of the guiding hole part 23b in the vertical direction Z. As shown in FIG. 1, the through hole 22a and the through hole 22b are in a rectangular shape that is long in the left-right direction X when viewed from the upper side. The through hole 22a and the through hole 22b overlap each other when viewed from the upper side.

As shown in FIG. 3, the through hole 22c penetrates a part in the upper body 22 from the front surface of the upper body 22 to the through hole 22b in the axial direction Y. The through hole 22c is provided at the lower end part of the front surface of the upper body 22. The through hole 22c opens on the lower side. As shown in FIG. 4, the through hole 22c is in a rectangular shape that is long in the left-right direction X when viewed from the front side. The centers of the through holes 22a, 22b, 22c in the left-right direction X are, for example, the same as the position of the central axis J in the left-right direction X.

As shown in FIG. 1, the part of the upper body 22 where the spool hole 23 is provided protrudes further to the upper side than the other part of the upper body 22. The upper surface at the front-side end part of this protruding part is a curved surface in a semicircular arc shape convex toward the upper side. The through hole 22a opens at the upper end part of the curved surface in a semicircular arc shape. The lower body main body 21a, the separate plate 21b, and the upper body 22 are each a single member, for example. The lower body main body 21a, the separate plate 21b, and the upper body 22 are made of a nonmagnetic material.

As shown in FIG. 3, the spool valve 30 is disposed along the central axis J extending in the axial direction Y that intersects the vertical direction Z. The spool valve 30 is in a circular columnar shape. The spool valve 30 is attached to the oil passage body 20. The spool valve 30 is disposed to be movable in the axial direction Y within the spool hole 23.

The spool valve 30 moves in the axial direction Y within the spool hole main body 23a, and opens and closes the opening part of the oil passage 10a that opens on the inner circumferential surface of the spool hole main body 23a. Though omitted in the drawings, a forward force from oil pressure of the oil or a driving device such as a solenoid actuator is applied to the rear-side end part of the spool valve 30. The spool valve 30 includes a supporting part 31a, a plurality of large diameter parts 31b, and a plurality of small diameter parts 31c. Each part of the spool valve 30 is in a circular columnar shape extending in the axial direction Y with the central axis J as the center.

The supporting part 31a is the front-side end part of the spool valve 30. The front-side end part of the supporting part 31a supports the rear-side end part of the magnet holder 80. The rear-side end part of the supporting part 31a is connected to the front-side end part of the large diameter part 31b.

The plurality of large diameter parts 31b and the plurality of small diameter parts 31c are alternately and continuously disposed from the large diameter part 31b connected to the rear-side end part of the supporting part 31a toward the rear side. The outer diameter of the large diameter part 31b is larger than the outer diameter of the small diameter part 31c. In the embodiment, the outer diameter of the supporting part 31a and the outer diameter of the small diameter part 31c are, for example, equal. The outer diameter of the large diameter part 31b is substantially equal to the inner diameter of the spool hole main body 23a, and is slightly smaller than the inner diameter of the spool hole main body 23a. The large diameter part 31b is movable in the axial direction Y while sliding with respect to the inner circumferential surface of the spool hole main body 23a. The large diameter part 31b functions as a valve part that opens and closes the opening part of the oil passage 10a that opens on the inner circumferential surface of the spool hole main body 23*a*. In the embodiment, the spool valve 30 is, for example, a single member made of metal.

The magnet holder 80 is disposed on the front side of the spool valve 30. The magnet holder 80 is disposed inside the guiding hole part 23*b* to be movable in the axial direction Y. The spool valve 30 and the magnet holder 80 are allowed to rotate relative to each other around the central axis. As shown in FIG. 2, the magnet holder 80 includes a holder main body part 81 and a facing part 82.

The holder main body part 81 is in a stepped circular columnar shape extending in the axial direction Y with the central axis J as the center. As shown in FIG. 3, the holder main body part 81 is disposed in the spool hole 23. More specifically, the holder main body part 81 is disposed in the guiding hole part 23*b*. The holder main body part 81 includes a sliding part 81*a* and a supported part 81*b*. That is, the magnet holder 80 includes the sliding part 81*a* and the supported part 81*b*.

The outer diameter of the sliding part 81*a* is larger than the outer diameter of the large diameter part 31*b*. The outer diameter of the sliding part 81*a* is substantially equal to the inner diameter of the guiding hole part 23*b*, and is slightly smaller than the inner diameter of the guiding hole part 23*b*. The sliding part 81*a* is movable in the axial direction Y while sliding with respect to the inner circumferential surface of the spool hole 23, that is, the inner circumferential surface of the guiding hole part 23*b* in the embodiment. The radial-direction outer edge part of the rear-side surface of the sliding part 81*a* can contact a front-side-facing step surface of a step formed between the spool hole main body 23*a* and the guiding hole part 23*b*. In this way, the magnet holder 80 can be suppressed from moving from the position where the magnet holder 80 contacts the step surface toward the rear side, and the furthest rear end position of the magnet holder 80 can be determined. As will be described later, since the spool valve 30 receives a backward force from the elastic member 70 via the magnet holder 80, the furthest rear end position of the spool valve 30 can be determined by determining the furthest rear end position of the magnet holder 80.

The supported part 81*b* is connected to the rear-side end part of the sliding part 81*a*. The outer diameter of the supported part 81*b* is smaller than the outer diameter of the sliding part 81*a* and the outer diameter of the large diameter part 31*b*, and larger than the outer diameter of the supporting part 31*a* and the outer diameter of the small diameter part 31*c*. The supported part 81*b* is movable in the spool hole main body 23*a*. The supported part 81*b* moves in the axial direction Y between the guiding hole part 23*b* and the spool hole main body 23*a* as the spool valve 30 moves in the axial direction Y.

The supported part 81*b* includes a supported concave part 80*b* that is recessed from the rear-side end part of the supported part 81*b* toward the front side. The supporting part 31*a* is inserted into the supported concave part 80*b*. The front-side end part of the supporting part 31*a* contacts the bottom surface of the supported concave part 80*b*. In this way, the magnet holder 80 is supported by the spool valve 30 from the rear side. The size of the supported part 81*b* in the axial direction Y is smaller than the size of the sliding part 81*a* in the axial direction Y, for example.

As shown in FIG. 2, the facing part 82 protrudes from the holder main body part 81 toward the radial-direction outer side. More specifically, the facing part 82 protrudes from the sliding part 81*a* toward the radial-direction outer side. In the embodiment, a pair of facing parts 82 are provided across the central axis J. The pair of facing parts 82 protrude from the outer circumferential surface of the sliding part 81*a* toward both sides in the left-right direction X. The facing part 82 extends in the axial direction Y from the front-side end part of the sliding part 81*a* to the rear-side end part of the sliding part 81*a*. As shown in FIG. 4, the facing part 82 is in a semicircular arc shape that is convex toward the radial-direction outer side when viewed from the front side.

The pair of facing parts 82 are fitted in the pair of groove parts 24. The facing part 82 faces the inner side surface 24*a* of the groove part 24 in the circumferential direction and can contact the inner side surface 24*a*. In addition, in the specification, that "two certain parts face each other in the circumferential direction" includes that both of the two parts are located on one virtual circle along the circumferential direction and that the two parts face each other.

As shown in FIG. 3, the magnet holder 80 includes a first concave part 81*c* that is recessed from the outer circumferential surface of the sliding part 81*a* toward the radial-direction inner side. In FIG. 3, the first concave part 81*c* is recessed from the upper end part of the sliding part 81*a* toward the lower side. The inner side surfaces of the first concave part 81*c* include a pair of surfaces facing the axial direction Y.

The magnet holder 80 includes a second concave part 80*a* that is recessed from the front-side end part of the magnet holder 80 toward the rear side. The second concave part 80*a* extends from the sliding part 81*a* to the supported part 81*b*. As shown in FIG. 2, the second concave part 80*a* is in a circular shape with the central axis J as the center when viewed from the front side. As shown in FIG. 3, the inner diameter of the second concave part 80*a* is larger than the inner diameter of the supported concave part 80*b*.

For example, the magnet holder 80 may be made of resin or made of metal. In the case where the magnet holder 80 is made of resin, the magnet holder 80 can be easily manufactured. Moreover, the manufacturing cost of the magnet holder 80 can be reduced. In the case where the magnet holder 80 is made of metal, the size accuracy of the magnet holder 80 can be improved.

As shown in FIG. 2, the magnet 50 is in a substantially rectangular parallelepiped shape. The upper surface of the magnet 50 is, for example, a surface that is curved in an arc shape along the circumferential direction. As shown in FIG. 3, the magnet 50 is accommodated in the first concave part 81*c* and fixed to the holder main body part 81. In this way, the magnet 50 is fixed to the magnet holder 80. The magnet 50 is fixed by, for example, an adhesive. The radial-direction outer side surface of the magnet 50 is located, for example, closer to the radial-direction inner side than the outer circumferential surface of the sliding part 81*a*. The radial-direction outer side surface of the magnet 50 faces the inner circumferential surface of the guiding hole part 23*b* in the radial direction with a gap therebetween.

As described above, the sliding part 81*a* provided with the first concave part 81*c* moves while sliding with respect to the inner circumferential surface of the spool hole 23. Therefore, the outer circumferential surface of the sliding part 81*a* and the inner circumferential surface of the spool hole 23 contact each other or face each other with a slight gap therebetween. As a result, it is difficult for foreign matters such as metal pieces contained in the oil to enter the first concave part 81*c*. Therefore, foreign matters such as metal pieces contained in the oil can be suppressed from attaching to the magnet 50 accommodated in the first concave part 81*c*. In the case where the magnet holder 80 is made of metal, since the size accuracy of the sliding part 81*a* can be improved, it is more difficult for the foreign matters such as metal pieces contained in the oil to enter the first concave part 81c.

As shown in FIG. 2, the fixing member 71 is in a plate shape whose plate surfaces are parallel to the left-right direction X. The fixing member 71 includes an extending part 71a and a bent part 71b. The extending part 71a extends in the vertical direction Z. The extending part 71a is in a rectangular shape that is long in the vertical direction Z when viewed from the front side. As shown in FIG. 1 and FIG. 3, the extending part 71a is inserted into the guiding hole part 23b through the through hole 22b. The upper end part of the extending part 71a is inserted into the through hole 22a. The extending part 71a closes a part of the opening of the guiding hole part 23b on the front side. The bent part 71b is bent from the lower-side end part of the extending part 71a toward the front side. The bent part 71b is inserted into the through hole 22c. The fixing member 71 is disposed on the front side of the elastic member 70.

In the embodiment, the fixing member 71 is inserted to the through hole 22a from the opening part of the through hole 22b, which opens on the lower surface of the upper body 22, through the through hole 22b and the guiding hole part 23b before the upper body 22 and the lower body 21 are overlapped. Then, as shown in FIG. 1, the upper body 22 and the lower body 21 are stacked and combined in the vertical direction Z, whereby the bent part 71b inserted in the through hole 22c can be supported by the upper surface of the lower body 21 from the lower side. In this way, the fixing member 71 can be attached to the oil passage body 20.

As shown in FIG. 3, the elastic member 70 is a coil spring extending in the axial direction Y. The elastic member 70 is disposed on the front side of the magnet holder 80. In the embodiment, at least a part of the elastic member 70 is disposed in the second concave part 80a. Therefore, at least a part of the elastic member 70 can be overlapped with the magnet holder 80 in the radial direction, and the size of the pressure control device 10 in the axial direction Y can be easily reduced. In the embodiment, the rear-side part of the elastic member 70 is disposed in the second concave part 80a.

The rear-side end part of the elastic member 70 contacts the bottom surface of the second concave part 80a. The front-side end part of the elastic member 70 contacts the fixing member 71. In this way, the front-side end part of the elastic member 70 is supported by the fixing member 71. The fixing member 71 receives a forward elastic force from the elastic member 70, and the extending part 71a is pressed against the front-side inner side surfaces of the through holes 22a, 22b.

By supporting the front-side end part of the elastic member 70 by the fixing member 71, the elastic member 70 applies a backward elastic force to the spool valve 30 via the magnet holder 80. Therefore, for example, the position of the spool valve 30 in the axial direction Y can be maintained at a position where the oil pressure of the oil or the force from a driving device such as a solenoid actuator applied to rear-side end part of the spool valve 30 and the elastic force of the elastic member 70 are balanced. In this way, the position of the spool valve 30 in the axial direction Y can be changed by changing the force applied to the rear-side end part of the spool valve 30, and the oil passage 10a inside the oil passage body 20 can be switched between opening and closing.

Further, the magnet holder 80 and the spool valve 30 can be pressed against each other in the axial direction Y by the oil pressure of the oil or the force from a driving device such as a solenoid actuator applied to rear-side end part of the spool valve 30 and the elastic force of the elastic member 70. Therefore, the magnet holder 80 moves in the axial direction Y as the spool valve 30 moves in the axial direction Y while relative rotation around the central axis with respect to the spool valve 30 is allowed.

The sensor module 40 includes a housing 42 and a magnetic sensor 41. The housing 42 accommodates the magnetic sensor 41. As shown in FIG. 1, the housing 42 is, for example, in a rectangular parallelepiped box shape flat in the vertical direction Z. The housing 42 is fixed to a flat surface located on the rear side of the curved surface in a semicircular arc shape, where the through hole 22a is provided, on the upper surface of the upper body 22.

As shown in FIG. 3, the magnetic sensor 41 is fixed to the bottom surface of the housing 42 inside the housing 42. In this way, the magnetic sensor 41 is attached to the oil passage body 20 via the housing 42. The magnetic sensor 41 detects the magnetic field of the magnet 50. The magnetic sensor 41 is, for example, a Hall element. Further, the magnetic sensor 41 may be a magnetoresistive element.

When the position of the magnet 50 in the axial direction Y changes as the spool valve 30 moves in the axial direction Y, the magnetic field of the magnet 50 passing through the magnetic sensor 41 changes. Therefore, by detecting the change in the magnetic field of the magnet 50 by the magnetic sensor 41, the position of the magnet 50 in the axial direction Y (that is, the position of the magnet holder 80 in the axial direction Y) can be detected. As described above, the magnet holder 80 moves in the axial direction Y as the spool valve 30 moves in the axial direction Y. Therefore, the position of the spool valve 30 in the axial direction Y can be detected by detecting the position of the magnet holder 80 in the axial direction Y.

The magnetic sensor 41 and the magnet 50 overlap in the vertical direction Z. That is, at least a part of the magnet 50 overlaps the magnetic sensor 41 in a direction parallel to the vertical direction Z in the radial direction. Therefore, the magnetic sensor 41 can easily detect the magnetic field of the magnet 50. As a result, the sensor module 40 can detect the position change of the magnet holder 80 in the axial direction Y (that is, the position change of the spool valve 30 in the axial direction Y) with higher accuracy.

In addition, in the specification, that "at least a part of the magnet overlaps the magnetic sensor in the radial direction" means that at least a part of the magnet may overlap the magnetic sensor in the radial direction in at least some positions within the range in which the spool valve to which the magnet is directly fixed moves in the axial direction. That is, for example, when the spool valve 30 and the magnet holder 80 change the positions in the axial direction Y from the positions of FIG. 3, the magnet 50 may not overlap the magnetic sensor 41 in the vertical direction Z. In the embodiment, a part of the magnet 50 overlaps the magnetic sensor 41 in the vertical direction Z at any position as long as the spool valve 30 is within the range in which the spool valve 30 moves in the axial direction Y.

The pressure control device 10 further includes a rotation stopping part. The rotation stopping part is a part that can contact the magnet holder 80. In the embodiment, the rotation stopping part is the inner side surface 24a of the groove part 24. That is, the facing part 82 faces the inner side surface 24a, which is the rotation stopping part, in the circumferential direction and can contact the inner side surface 24a.

Therefore, according to the embodiment, for example, when the facing part 82 tries to rotate around the central axis J, the facing part 82 contacts the inner side surface 24a, which is the rotation stopping part. As a result, rotation of the facing part 82 is suppressed by the inner side surface 24a, and rotation of the magnet holder 80 around the central axis J is suppressed. As a result, the position of the magnet 50 fixed to the magnet holder 80 can be suppressed from shifting in the circumferential direction. Therefore, even when the spool valve 30 rotates around the central axis J when the position of the spool valve 30 in the axial direction Y does not change, the information of the position of the magnet 50 in the axial direction Y detected by the magnetic sensor 41 can be suppressed from changing. In this way, the information of the position of the spool valve 30 can be suppressed from changing, and the accuracy of grasping the position of the spool valve 30 in the axial direction Y can be improved.

Further, according to the embodiment, the rotation stopping part is the inner side surface 24a of the groove part 24. Therefore, it is not necessary to prepare a separate member as the rotation stopping part, and the number of components of the pressure control device 10 can be reduced. In this way, the effort required for the assembly of the pressure control device 10 and the manufacturing cost of the pressure control device 10 can be reduced.

As described above, the oil passing through the pressure control device 10 may contain foreign matters such as metal pieces. It is preferable that such foreign matters are captured in the course of the oil passing through the pressure control device 10 and are prevented from flowing further to the downstream side. Therefore, the pressure control device 10 is configured to be capable of capturing foreign matters. Hereinafter, this configuration and operation will be described with reference to FIG. 5 to FIG. 9.

In addition, though the pressure control device 10 is applied to an oil pressure control device which controls the pressure of oil in the embodiment, it is not limited thereto. Examples of devices to which the pressure control device 10 can be applied include fluid devices such as a water pressure control device that controls the pressure of water and an air pressure control device that controls the pressure of air in addition to an oil pressure control device. In this case, things that pass through the pressure control device 10 include fluids such as oil, water, and air, and these are collectively referred to as a "fluid Q" in the following description.

Figure 5:
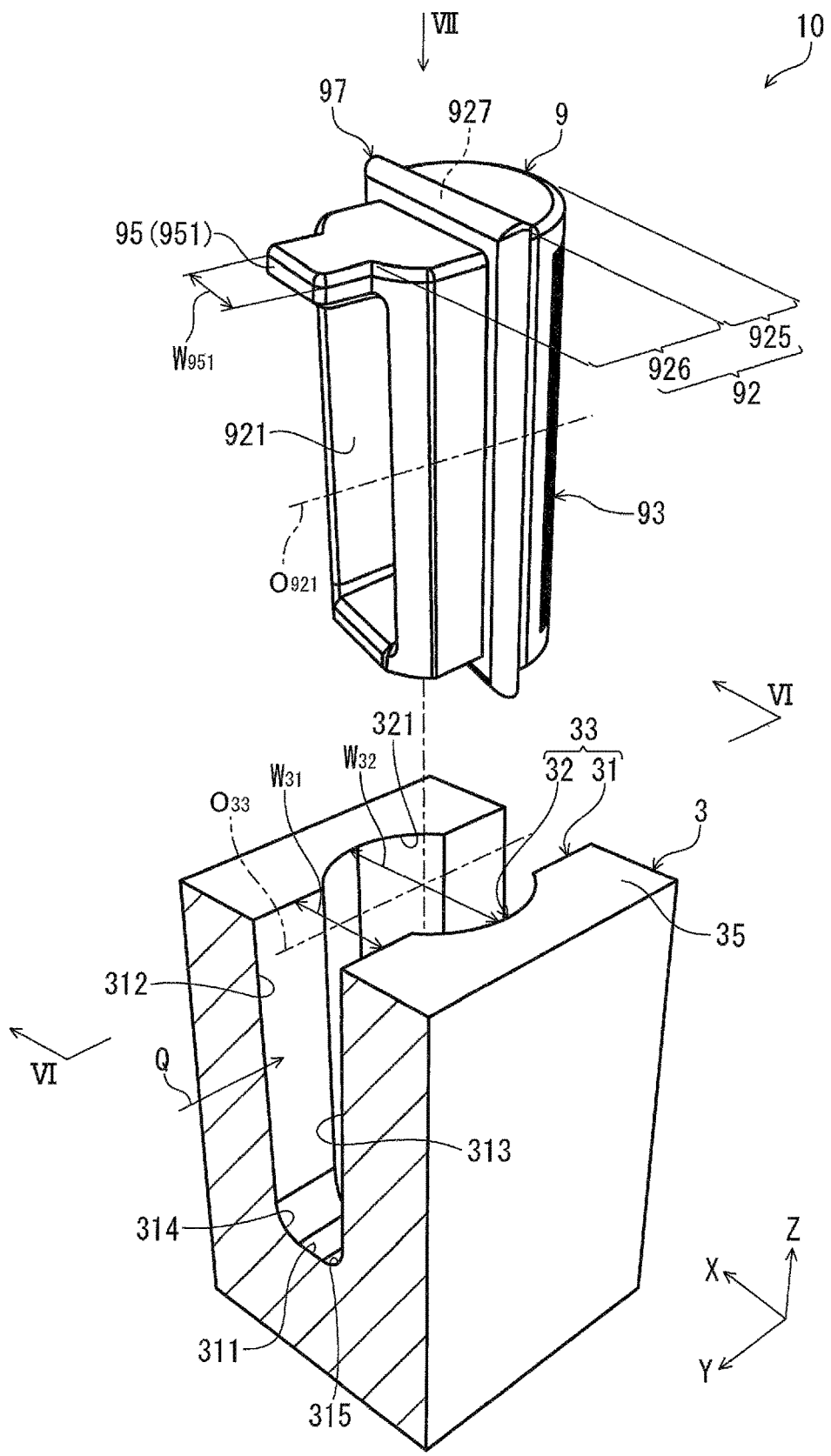
FIG. 5 is an exploded perspective view of a part of the pressure control device shown in FIG. 1.

In addition to the spool valve 30, the magnet holder 80, the magnet 50, the elastic member 70, the fixing member 71, the sensor module 40 and the like described above, the pressure control device 10 further includes a filter unit 9 attached to a body 3 as shown in FIG. 5.

Figure 6:
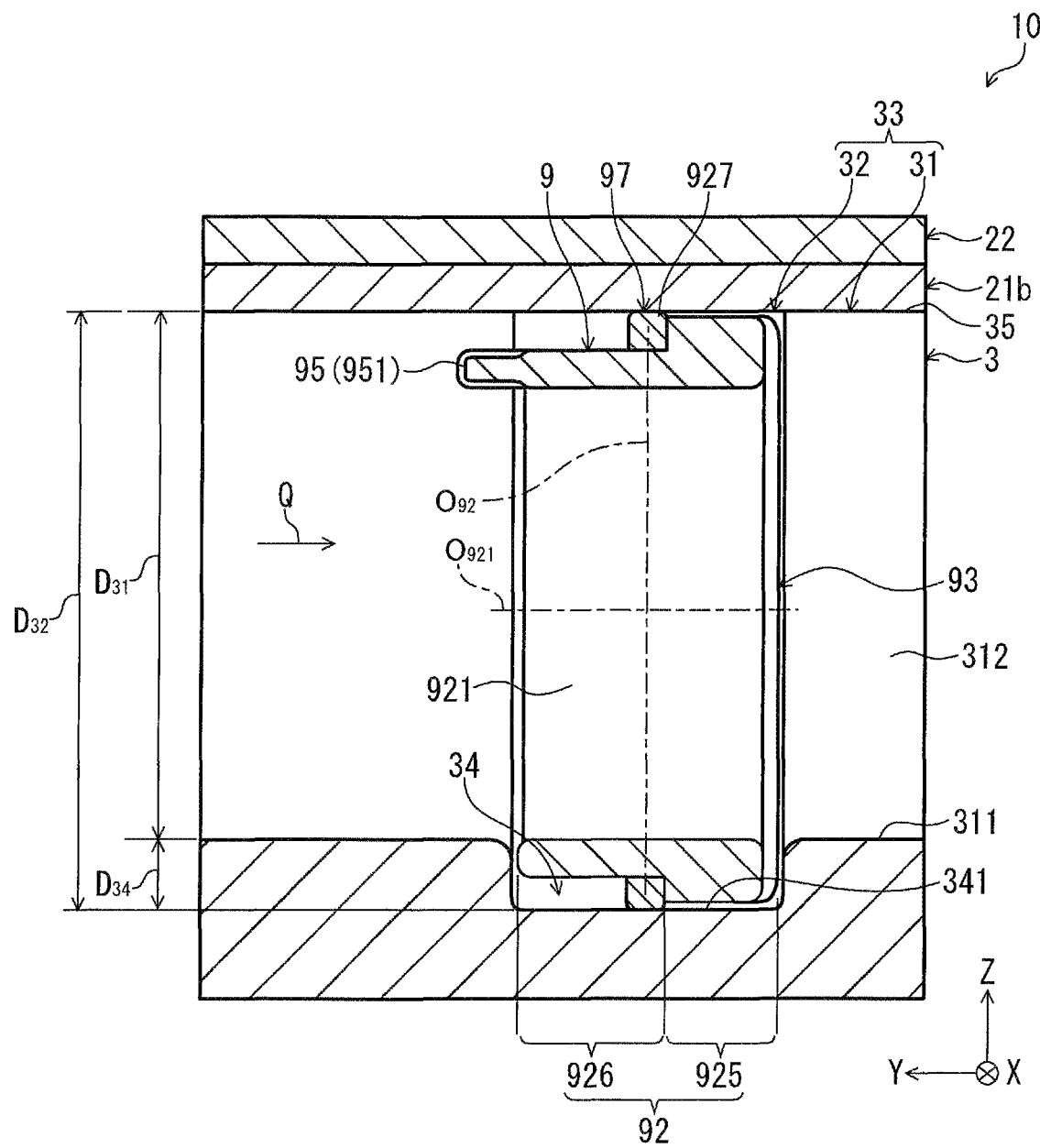
FIG. 6 is a cross-sectional view taken along the line VI-VI in FIG. 5.
Figure 7:
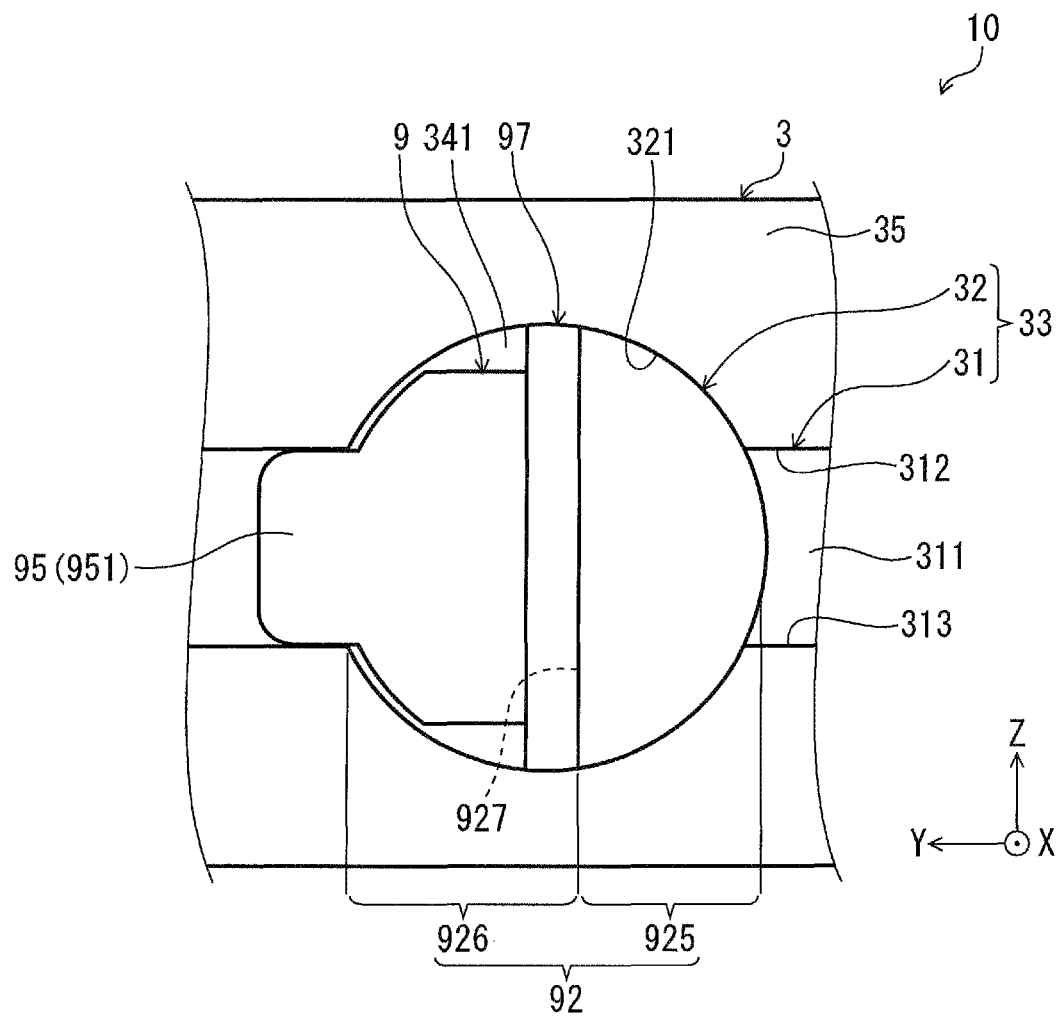
FIG. 7 is a view as viewed from the direction of the arrow VII in FIG. 5.

The body 3 may be at least one of the lower body 21 and the upper body 22 that constructs the oil passage body 20. As shown in FIG. 5 to FIG. 7, the body 3 includes a groove-shaped flow path 33 which is provided in a recessed manner on an upper surface (surface) 35 and through which the fluid Q passes. The groove-shaped flow path 33 includes a groove part 31 and a widened part 32 connected to the groove part 31, and the groove-shaped flow path 33 constructs a part of the oil passage 10a.

The groove part 31 includes a bottom part (first bottom part) 311, a side wall part 312 located on the left side of the bottom part 311, and a side wall part 313 located on the right side of the bottom part 311. In addition, it is preferable that a boundary part 314 between the bottom part 311 and the side wall part 312 and a boundary part 315 between the bottom part 311 and the side wall part 313 are rounded as shown in FIG. 5. In this way, the fluid Q can smoothly pass through the vicinity of the boundary part 314 and the boundary part 315.

The groove part 31 is in a linear shape along the axial direction Y in the plan view of the body 3, but it is not limited thereto, and the groove part 31 may include at least a part that is curved. A width (first width) $W_{31}$ (with reference to FIG. 5) of the groove part 31, which is the distance between the side wall part 312 and the side wall part 313, is substantially constant along the axial direction Y. Further, a depth (first depth) $D_{31}$ (with reference to FIG. 6) of the groove part 31, which is the depth from the surface 35 to the bottom part 311, is also substantially constant along the axial direction Y.

The widened part 32 is provided in the longitudinal direction of the groove-shaped flow path 33, that is, in the middle in the axial direction Y. The widened part 32 extends from the surface 35 to the bottom part 311, has a width $W_{32}$ (with reference to FIG. 5) larger than the width $W_{31}$ of the groove part 31, and functions as an accommodating part in which the filter unit 9 in a cylindrical shape is accommodated. The width $W_{32}$ of the widened part 32 gradually increases from the upstream side to the downstream side (that is, from the front side to the rear side), and gradually decreases from the middle toward the downstream side. Specifically, in the embodiment, the widened part 32 includes a curved part 321 that is curved in an arc shape in the plan view.

The widened part 32 in such a shape can be processed by an end mill, for example.

As shown in FIG. 6, the widened part 32 has a depth (second depth) $D_{32}$ from the surface 35 to a bottom surface (second bottom part) 341 while maintaining the width $W_{32}$ constant along the vertical direction Z, and the depth $D_{32}$ is larger than the depth $D_{31}$ of the groove part 31. The widened part 32 includes, on the bottom part thereof, a receiving part 34 which a part of the filter unit 9 on the lower side enters. With the receiving part 34, for example, foreign matters mixed in the fluid Q can be prevented from bypassing the filter unit 9 and flowing to the downstream side. Further, of course, a depth $D_{34}$ of the receiving part 34 is equal to the difference between the depth $D_{32}$ and the depth $D_{31}$.

As shown in FIG. 5 and FIG. 6, the filter unit 9 is accommodated in the widened part 32 so that the direction of a central axis $O_{92}$ of a frame body 92 is along the direction of the depth $D_{32}$ of the widened part 32 (that is, the vertical direction Z). The filter unit 9 can capture the foreign matters mixed in the fluid Q when the fluid Q passes through the groove-shaped flow path 33. In this way, for example, the malfunction of operation of the pressure control device 10 caused by foreign matters can be prevented or suppressed. Examples of the malfunction include inhibition of movement of the spool valve 30 when it moves in the spool hole 23.

Further, when the body 3 and the filter unit 9 are assembled, the assembly can be performed by simple work of inserting the filter unit 9 into the widened part 32. As described above, the widened part 32 is wider than the groove part 31. Therefore, the filter unit 9 can be easily inserted into the widened part 32 regardless of the width $W_{31}$ of the groove part 31, and thus the workability when the body 3 and the filter unit 9 are assembled is improved.

Then, the separate plate 21b serving as a plate-shaped member that covers the groove-shaped flow path 33 is attached to the body 3 in the state where the filter unit 9 is accommodated in the widened part 32. Further, in the pressure control device 10, the separate plate 21b can be omitted. In this case, the upper body 22 is directly attached to the body 3 as a plate-shaped member that covers the groove-shaped flow path 33.

As shown in FIG. 5 and FIG. 6, the filter unit 9 includes the frame body 92, a filter member 93, and a seal member 97.

Figure 9:
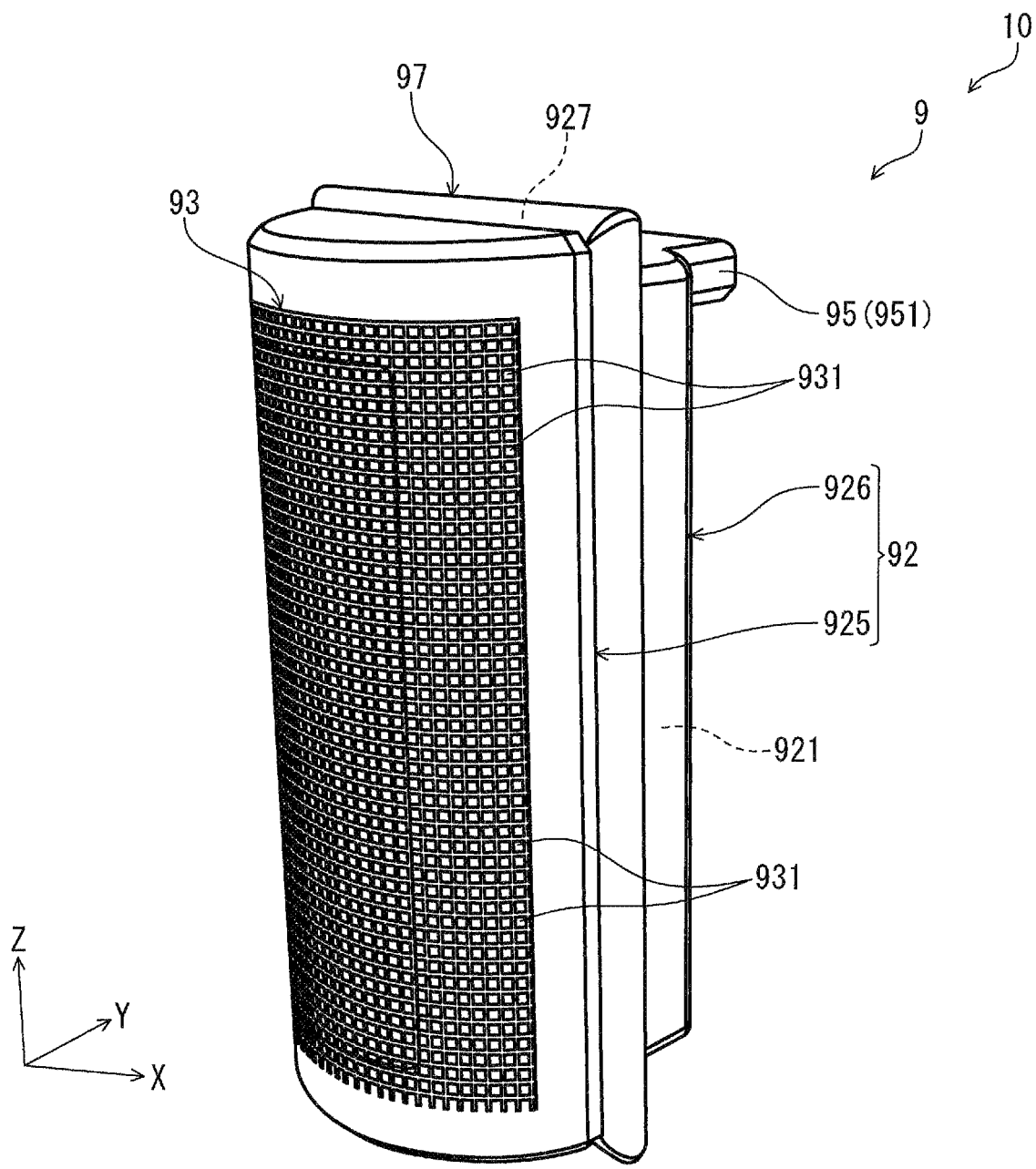
FIG. 9 is a perspective view of the filter unit in FIG. 5.

The frame body 92 is in a columnar shape along the direction of the central axis $O_{92}$ and includes a through hole part 921 which penetrates in parallel with the axial direction Y orthogonal to the central axis $O_{92}$. The fluid Q can pass through the through hole part 921 in the widened part 32. Further, as shown in FIG. 9, the filter member 93 in a planar plate shape is disposed on one end side in the direction of the axis $O_{33}$ of the groove-shaped flow path 33 (that is, on the rear side in the axial direction Y) with respect to the through hole part 921. In this way, the foreign matters contained in the fluid Q passing through the through hole part 921 can be captured by the filter member 93.

Further, the filter member 93 includes a plurality of small holes 931 penetrating in its thickness direction. The small holes 931 are disposed at intervals along both the left-right direction X and the vertical direction Z. The diameter of the small hole 931 is set to be smaller than an average foreign matter diameter, and it is preferable that the total area of the small holes 931 is as large as possible so as not to inhibit the flow of the fluid, and it is also preferable that the opening ratio is as large as possible. With such small holes 931, the foreign matter capturing property of the filter unit 9 is improved.

The frame body 92 has a cross-sectional shape along a central axis $O_{921}$ of the through hole part 921 (that is, the shape of a cross-sectional surface—a cross section cut into a ring—orthogonal to the central axis $O_{921}$) that changes in the middle in the direction along the central axis $O_{921}$. Specifically, the frame body 92 includes a first part 925 whose outer side shape (profile) in its cross section and viewed from the central axis $O_{921}$ has a first contour in a rectangular shape, and a second part 926 whose outer side shape (profile) viewed from the central axis $O_{921}$ has a second contour in a rectangular shape smaller than the first contour. In this way, a step part 927 is located at a boundary part between the first part 925 and the second part 926 along the outer-side circumferential edge part of the frame body 92 when viewed from the through hole part 921.

As shown in FIG. 5 to FIG. 9, the seal member 97 in a ring shape can be hooked and fixed to the step part 927. In this way, the seal member 97 is disposed along the outer-side circumferential edge part of the frame body 92 when viewed from the direction along the central axis $O_{921}$ of the through hole part 921 (that is, from the axial direction Y). Further, the seal member 97 is made of an elastic material. In this way, as shown in FIG. 7, the seal member 97 is compressed between the frame body 92 and the widened part 32 and elastically deforms. Thus, by the elastic deformation of the seal member 97, the filter unit 9 can be prevented from detaching from the widened part 32 when the body 3 and the filter unit 9 are assembled. Due to this detachment prevention effect, for example, even if the body 3 and the filter unit 9 in the assembly state are turned upside down, or even if vibration is applied during transportation, unintentional disassembly of the body 3 and the filter unit 9 when the filter unit 9 is detached from the widened part 32 can be prevented.

Figure 8:
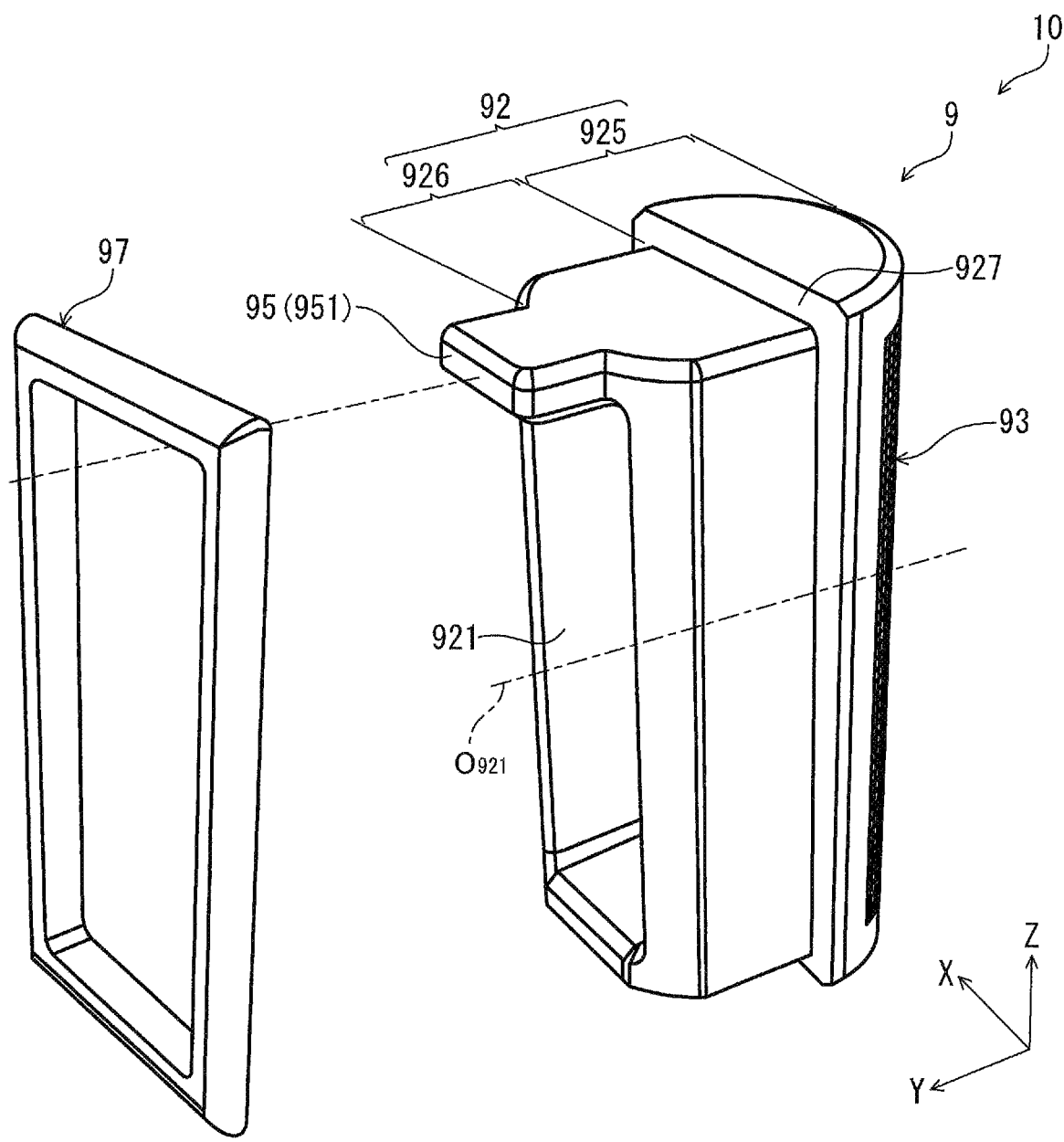
FIG. 8 is an exploded perspective view of the filter unit in FIG. 5.

In addition, as described above, the frame body 92 includes the first part 925 that has the first contour and the second part 926 that has the second contour smaller than the first contour. Therefore, as shown in FIG. 8, when the seal member 97 is mounted on the frame body 92, the seal member 97 can be inserted from the second part 926 side, whereby the mounting work of the seal member 97 can be easily performed.

Further, the second part 926 has a length (height) in the vertical direction Z smaller than a length (height) of the first part 925 in the vertical direction Z, and the second part 926 has a length (width) in the left-right direction X smaller than a length (width) of the first part 925 in the left-right direction X, but it is not limited thereto. For example, the length of the second part 926 in the vertical direction Z may be smaller than the length of the first part 925 in the vertical direction Z while the length of the second part 926 in the left-right direction X may be equal to the length of the first part 925 in the left-right direction X. On the contrary, the length of the second part 926 in the vertical direction Z may be equal to the length of the first part 925 in the vertical direction Z while the length of the second part 926 in the left-right direction X may be smaller than the length of the first part 925 in the left-right direction X.

In the embodiment, when viewed from the central axis $O_{92}$ of the frame body 92, the contour shape of the first part 925 is an arc shape, and the contour shape of the second part 926 is a quadrangular shape (rectangular shape). In this way, the step part 927 can be formed notably. Further, the step part 927 functions as a fixing part that fixes the seal member 97 to the frame body 92.

In addition, the fixing part is not limited to being configured by the step part 927 as long as the seal member 97 can be fixed to the frame body 92. For example, the fixing part may be configured by a groove provided along the outer-side circumferential edge part of the frame body 92 when viewed from the through hole part 921. In this case, the first contour and the second contour can be made substantially the same.

Further, as shown in FIG. 5 and FIG. 6, when the flow of the fluid Q passing through the groove-shaped flow path 33 is directed from the front side in the axial direction Y to the rear side in the axial direction Y, the frame body 92 is disposed so that the first part 925 is located on the downstream side of the groove-shaped flow path 33 (that is, the rear side in the axial direction Y) and the second part 926 is located on the upstream side of the groove-shaped flow path 33 (that is, the front side in the axial direction Y). In addition, the filter member 93 is disposed on the first part 925 of the frame body 92. The filter member 93 is curved in an arc shape along the arc-shaped contour shape of the first part 925 in the same manner as the first part 925. In this way, the contact area of the filter member 93 with respect to the fluid Q can be ensured to be wide, whereby the foreign matter capturing function of the filter member 93 is improved.

As shown in FIG. 7, the frame body 92 includes a regulating part 95 which regulates the disposition direction of the filter member 93 with respect to the groove part 31 and which serves as a detent around the central axis $O_{92}$ of the filter unit 9 in the state where the filter unit 9 is accommodated in the widened part 32. The regulating part 95 includes a protruding part 951 which is provided on the upper part of the second part 926 and which protrudes in a block shape or a plate shape from the second part 926 (the widened part 32) toward the groove part 31 on the upstream side.

The protruding part 951 is disposed in the groove part 31. Further, at this time, the protruding part 951 may abut against at least one of the side wall part 312 and the side wall part 313 of the groove part 31. With the protruding part 951 of this kind, the filter unit 9 can be prevented from rotating in either the clockwise direction or the counterclockwise direction with the central axis $O_{92}$ as the center when being accommodated in the widened part 32. In this way, even when the pressure control device 10 is in operation, the posture of the filter member 93 in the widened part 32 can be stabilized, and the filter member 93 can face the direction of the flow of the fluid Q and can capture the foreign matters in the fluid Q. Further, when the filter unit 9 is accommodated in the widened part 32, the above-described disposition direction of the filter unit 9 with respect to the groove part 31 can be quickly grasped, whereby the assembly work of the body 3 and the filter unit 9 can be performed smoothly.

Since the regulating part 95 is configured by such a simple block-shaped or plate-shaped protruding part 951, it contributes to high efficiency when the regulating part 95 is manufactured. In addition, it is preferable that a width $W_{951}$ of the protruding part 951 is somewhat smaller than the width $W_{31}$ of the groove part 31.

Further, since the regulating part 95 is provided on the upper part of the second part 926, the regulating part 95 can be disposed as close to the corner of the groove-shaped flow path 33 as possible, whereby the regulating part 95 can be prevented or suppressed from inhibiting the flow of the fluid Q.

The regulating part 95 is not limited to being provided on the second part 926. For example, the regulating part 95 may be provided on the first part 925, or may be provided on both the first part 925 and the second part 926.

In the filter unit 9 with the above configuration, for example, it is preferable that the frame body 92 is made of a resin material and that the filter member 93 is made of a metal material. In this way, the filter unit 9 can be an insert-molded product of the frame body 92 and the filter member 93. Since the filter unit 9 is an insert-molded product, when the filter unit 9 is manufactured, for example, the manufacturing process can be shortened compared with the case where the frame body 92 and the filter member 93 are configured as separate bodies and joined together; that is, high efficiency can be achieved when the filter unit 9 is manufactured. Further, the filter unit 9 is not limited to an insert-molded product of the frame body 92 and the filter member 93. For example, according to the manufacturing conditions of the filter unit 9, the filter unit 9 can be a joined body in which the frame body 92 and the filter member 93 are configured as separate bodies and joined together.

Hereinafter, a second embodiment of the pressure control device of the disclosure will be described with reference to FIG. 10, but the description will focus on differences from the above-described embodiment, and the description of the same matters will be omitted.

This embodiment is the same as the first embodiment except that the configuration of the frame body is different.

Figure 10:
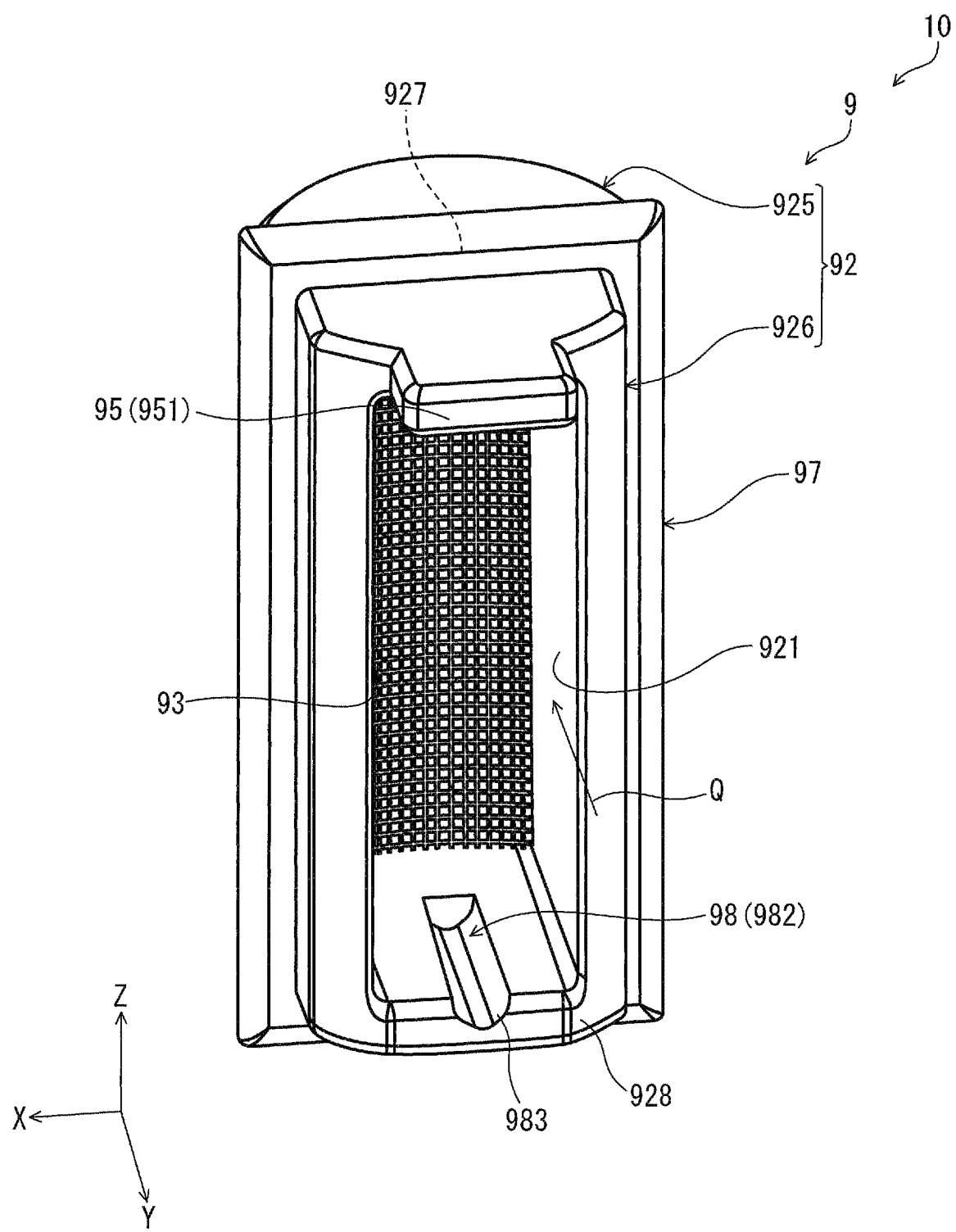
FIG. 10 is a perspective view of the filter unit provided in the pressure control device (the second embodiment) of the disclosure.

As shown in FIG. 10, in the embodiment, the frame body 92 includes a storage part 98 which is provided on the bottom part side of the groove-shaped flow path 33 (that is, on a lower part 928) and which stores the foreign matters captured by the filter member 93. The storage part 98 is configured by a groove 982 which opens facing the through hole part 921 and which extends from the second part 926 on the upstream side toward the first part 925 on the downstream side. In this way, the foreign matters stored in the storage part 98 can be prevented from returning to the groove-shaped flow path 33.

Further, in the embodiment, the groove 982 does not penetrate the lower part 928.

In addition, it is preferable that the groove 982 opens on the upstream side. In this way, the foreign matters flowing together with the fluid Q may directly enter the groove 982 from an opening part 983 of the groove 982 on the upstream side. In this case, in combination with the filter member 93, the foreign matter capturing property is improved.

Although the pressure control device of the disclosure has been described above with the embodiments of the drawings, the disclosure is not limited thereto. Each part which configures the pressure control device can be replaced with any configuration which can exhibit the same function. Moreover, any component may be added.

Further, the pressure control device of the disclosure may be a combination of any two or more configurations (features) of the above embodiments.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A pressure control device comprising:
an oil passage body that includes therein an oil passage through which oil flows;
a spool valve that is attached to the oil passage body;
a body that is at least one of a lower body and an upper body that constructs the oil passage body, and the body comprises a groove-shaped flow path, and the groove-shaped flow path comprising:
a groove part; and
a widened part, connected to the groove part and having a width larger than a width of the groove part;
a filter unit which captures foreign matters mixed in a fluid which passes through the groove-shaped flow path, wherein the filter unit comprises:
a frame body, comprising a through hole part which penetrates in a direction orthogonal to a central axis of the frame body;
a filter member being in a planar plate shape, disposed on one end side in a direction of an axis of the groove-shaped flow path with respect to the through hole part; and
a seal member in a ring shape, disposed along an outer-side circumferential edge part of the frame body when viewed from the through hole part,
wherein the filter unit is accommodated in the widened part so that a direction of the central axis of the frame body is along a depth direction of the widened part; and
a plate-shaped member which is attached to the body to cover the groove-shaped flow path in a state where the filter unit is accommodated in the widened part,
wherein the frame body comprises a regulating part which regulates a disposition direction of the filter member with respect to the groove part.

2. The pressure control device according to claim 1, wherein
the frame body comprises a fixing part, and
the fixing part is disposed along the outer-side circumferential edge part when viewed from the through hole part and which fixes the seal member.

3. The pressure control device according to claim 2, wherein
the frame body is in a columnar shape along the direction of the central axis, and the frame body comprises:

a first part whose outer side shape in a cross section along a central axis of the through hole part and viewed from the central axis is a first shape;

a second part whose outer side shape in a cross section along the central axis of the through hole part and viewed from the central axis is a second shape smaller than the first shape; and a step part which is located at a boundary part between the first part and the second part and which functions as the fixing part.

4. The pressure control device according to claim 3, wherein the frame body is disposed so that the first part is located on a downstream side of the groove-shaped flow path and the second part is located on an upstream side of the groove-shaped flow path.

5. The pressure control device according to claim 3, wherein when viewed from the central axis of the frame body, a contour shape of the first part is an arc shape, and a contour shape of the second part is a quadrangular shape.

6. The pressure control device according to claim 5, wherein the filter member is disposed on the first part of the frame body, and the filter member in the planar plate shape is curved in an arc shape along the arc-shaped contour shape of the first part of the frame body in the same manner.

7. The pressure control device according to claim 3, wherein the regulating part is provided on the second part.

8. The pressure control device according to claim 1, wherein the regulating part comprises a protruding part, and the protruding part protrudes from the widened part toward the groove part.

9. The pressure control device according to claim 1, wherein the seal member is made of an elastic material.

10. The pressure control device according to claim 1, wherein the frame body comprises a storage part, the storage part is provided on a bottom part side of the groove-shaped flow path, and the storage part stores the foreign matters that have been captured.

11. The pressure control device according to claim 1, wherein the frame body and the filter member are an insert-molded product.

12. The pressure control device according to claim 1, wherein the widened part comprises a receiving part, the receiving part is provided to have a depth larger than a depth of the groove part, and a part of the filter unit enters the receiving part.

13. The pressure control device according to claim 1, wherein the frame body is in a columnar shape along the direction of the central axis.

* * * * *